Patented Sept. 2, 1930

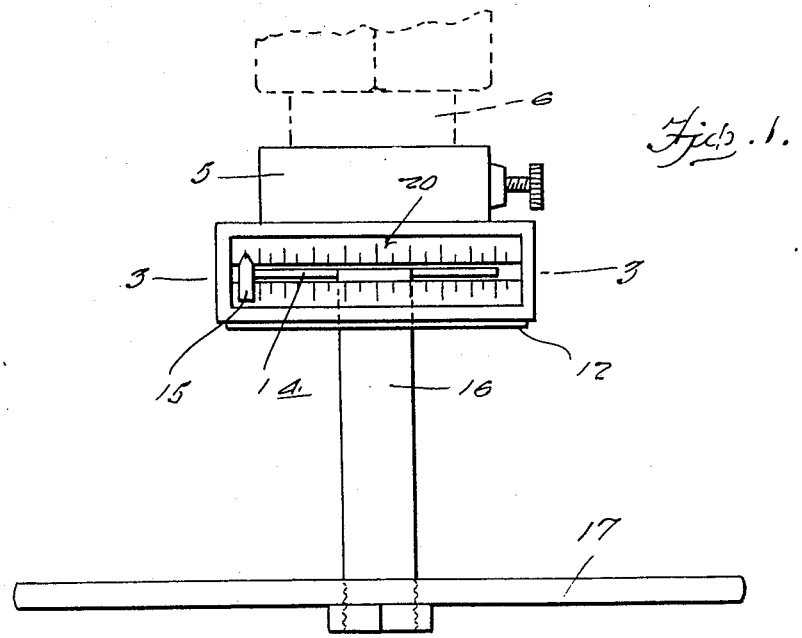
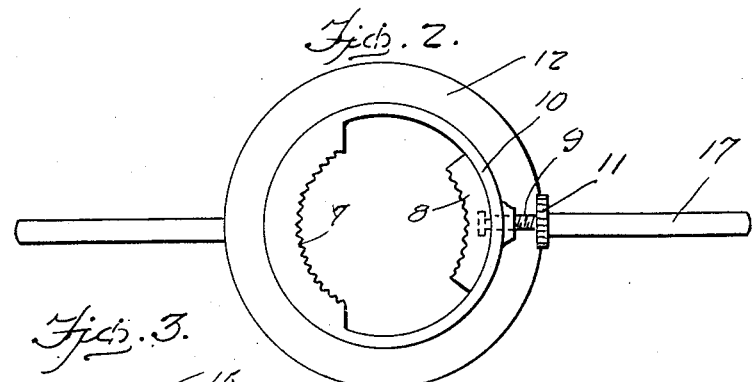
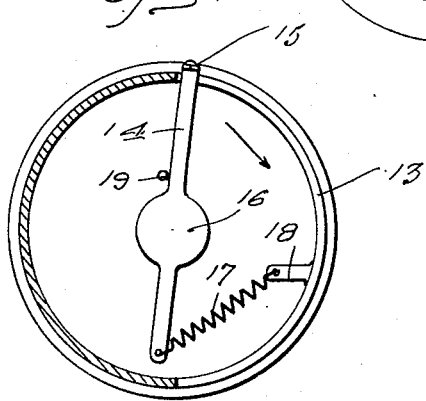

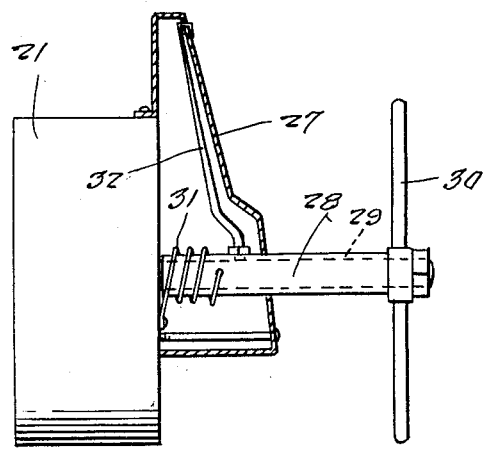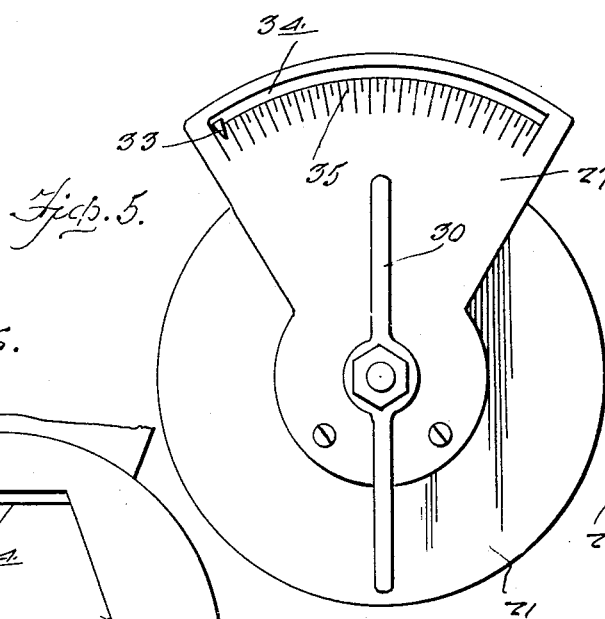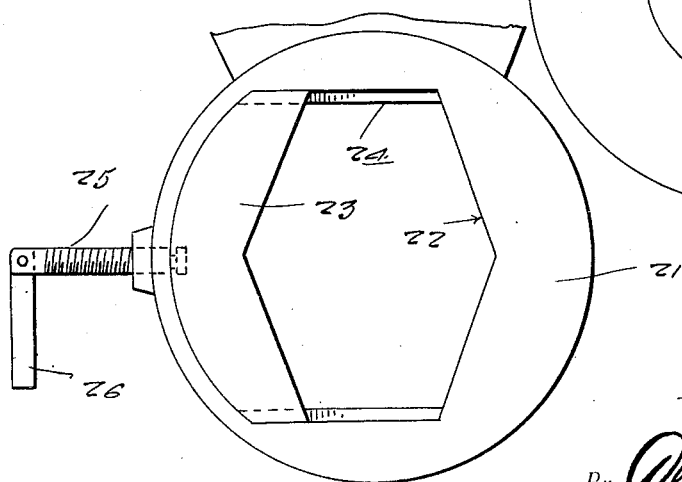

1,775,075

UNITED STATES PATENT OFFICE

JOHN A. WATSON AND LAURENCE E. MILLER, OF PAXTON, ILLINOIS; SAID MILLER ASSIGNOR TO SAID WATSON

FRICTION-TESTING DEVICE FOR ROTATING MEMBERS

Application filed May 9, 1928. Serial No. 276,283.

The present invention relates to friction testing devices adapted particularly for use in the testing of the frictional gripping engagement of vehicle wheel brake bands, and to also employ the principles embodied in the invention for determining the extent of friction present during the rotation of a shaft or other rotatable member. An important object of the invention is to provide a device of this character, by means of which the braking force of the respective brake bands of a motor vehicle may be determined and thus enable said brake bands to be properly adjusted so as to equalize the same.

A still further important object of the invention is to provide a device of this character which may be easily and quickly attached and removed from the wheel associated with the brake band desired to be tested, without necessitating the removal of the wheel or any other part of the vehicle during the testing operation.

Another object is to provide a device of this character of a simple and practical construction, which is efficient and reliable in performance, strong and durable, relatively inexpensive to manufacture, and otherwise well adapted to the purpose for which the same is intended.

Other objects and advantages reside in the special construction and combination of the various elements comprising the invention, reference being had to the accompanying drawings, forming a part hereof, wherein:

Figure 1 is a top plan view showing one form of the invention attached to the wheel hub of an automobile for testing the brakes of said wheel.

Figure 2 is a rear elevational view showing the hub attaching clamp.

Figure 3 is a transverse sectional view, taken substantially along the line 3—3 of Figure 1.

Figure 4 is a view in side elevation, with parts broken away and shown in section of a modified form of the testing device.

Figure 5 is a front elevational view thereof, and

Figure 6 is a rear elevational view illustrating the clamping means of such modified form of the invention.

Referring now to the drawings in detail, and more particularly to the form of the invention as illustrated in Figures 1 and 2 and 3 of the drawings, inclusive, the invention comprises a clamping member 5, preferably of an annular formation, as shown in Figure 2 of the drawings and adapted to fit over the hub cap 6 of an automobile or similar vehicle wheel. The inner periphery of the clamping member is formed with a stationary clamping jaw 7 opposed to a movable jaw 8 in the annular member 5 and operable with respect to the stationary jaw for movement into and out of clamping position by means of a screw 9 threaded through the portion 10 of the clamping member, the outer end of said screw being provided with a knurled operating head 11. An indicator arm housing 12 is formed at one side of the clamping member, said housing having a slot 13, through which one end of an indicator arm 14 extends, with the outer end of said arm having an indicator finger 15 formed thereon. The arm 14 is mounted on the inner end of a shaft 16, journaled for rotation in the housing 12 and extending outwardly thereof with its outer end provided with an operating handle 17. To the end of the arm opposite from the indicating finger 15 is attached a spring 17, secured to a lug 18, formed at the inside of the housing 12. The spring 17 is arranged so as to yieldably retain the arm 14 with the indicating finger at one end of the slotted opening 13 of the housing. A stop 19 formed at the inside of the housing engages the arm, whereby to prevent the same from striking the edge of the slotted opening. An indicating scale 20 is arranged on the outside of the housing 12, along the edge of the slotted opening 13, in association with the indicating finger 15. In the operation of this form of the invention, the clamping member 5 is secured to the hub cap 6 of the vehicle wheel, or other rotating member, desired to be placed under test with respect to the extent of friction in the mounting thereof and upon the operation of the handle 17, the wheel or other rotating member may thus be tried.

If such rotating member is free from any frictional engagement, the indicating finger 15 will remain stationary with respect to the indicating scale 20, during the operation of the handle 17. However, should any frictional engagement be present, during the rotation of the member, a greater force will be required to turn such member through the handle 17, and such added force will be applied to the spring 17 so as to cause an expansion thereof and the indicating arm 14 will also be moved a proportional extent and the extent of such movement will be indicated by the indicating finger 15 with respect to the associated scale.

By constructing the spring 17 of a predetermined strength, it will be apparent that the amount of friction present in the rotating member may be determined by the relative movement of the indicating finger 15 with respect to the scale. Where it is desired to adjust a set of brakes of an automobile or other vehicle, so as to equalize the brakes of each wheel, it will be apparent that after one of the brakes has been adjusted to a desired extent, the amount of friction between the brake drum and brake band may be determined by attaching the testing device in a manner as heretofore explained, and ascertaining the extent of such frictional engagement through the movement of the indicating finger 15. By then attaching the testing device to the other wheels of the vehicle, the brake associated therewith may be then adjusted to an extent equal to that of the wheel.

In Figures 4 to 6 inclusive of the drawings, we have illustrated a modified form of the invention comprising a clamping member 21, likewise of annular formation and having an angular portion 22 formed at the inner side thereof. A movable clamping head 23 is carried by the clamping member, likewise having its clamping face angularly disposed in opposed relation to the section 22, the side edges of the clamping head being slidably arranged in grooves 24 formed at the opposite sides of the clamping member. An operating screw 25 is threaded through the clamping member with one end attached to the clamping head 23 and its outer end provided with an operating handle 26 and through the operation thereof to enable the head 23 to be moved into clamping position about the work. To one side of the clamping member 21 is attached the housing 27, with a rod 28 extending outwardly therefrom. A tubular shaft 29 is rotatably supported on the rod with its outer end provided with an operating handle 30, and a spring 31 is attached thereto adjacent its inner end and connected with the adjacent face of the clamping member 21. An indicating arm 32 extending laterally from one side of the shaft 29 has the outer end provided with an indicating finger 33, extending through a slotted opening 34 formed in the housing. Adjacent the edge of the slotted opening is arranged a scale 35 in association with the indicator finger 33.

The operation of this form of the testing device is similar to that of the first mentioned form of the invention, and a further detailed information of the operation thereof is therefore deemed unnecessary. It will therefore be apparent from the foregoing that the device may be used for determining the amount of friction present during the rotation of a shaft of any character, in addition to being used with effect to determine the pressure of vehicle wheel brakes, so as to indicate the presence of excessive friction in the rotating mounting of the same.

It is obvious that the invention is susceptible of various changes and modifications, without departing from the spirit or scope of the invention or sacrificing any of its advantages, and we accordingly claim all such forms of the device to which we are entitled.

Having thus described our invention, what we claim as new is:

1. A friction indicator for rotating devices, comprising an open clamping member, a jaw movable in said clamping member, and means connected to the jaw and engaging the clamping member whereby the jaw may be fixed on and released from rotatable devices, a housing disposed at one side of said clamping member and fixed thereto, and having a slot in its wall and a scale adjacent said slot, a shaft rotatably supported in the housing and extending outwardly therefrom, an indicating arm within the housing and attached to said shaft and movable in said slot for cooperation with said scale, and a spring interposed between and connected to the housing and the said rotatable means.

2. A device for the purpose described comprising a housing equipped at one side thereof with means for fixing it on rotatable devices, said housing having a slot in its wall and a scale adjacent said slot, a shaft journaled in the housing and extending outside thereof and having within the housing an arm movable in said slot and adapted to cooperate with said scale, a spring interposed between and connecting the housing and said shaft and also disposed in the housing; said shaft adapted to be rotated manually by power applied thereto outside the housing.

In testimony whereof we affix our signatures.

JOHN A. WATSON.
LAURENCE E. MILLER.